Dec. 10, 1968  E. H. BUCKNELL ETAL  3,415,279
COAXIAL CONTROL VALVE
Filed Oct. 22, 1965  3 Sheets-Sheet 1
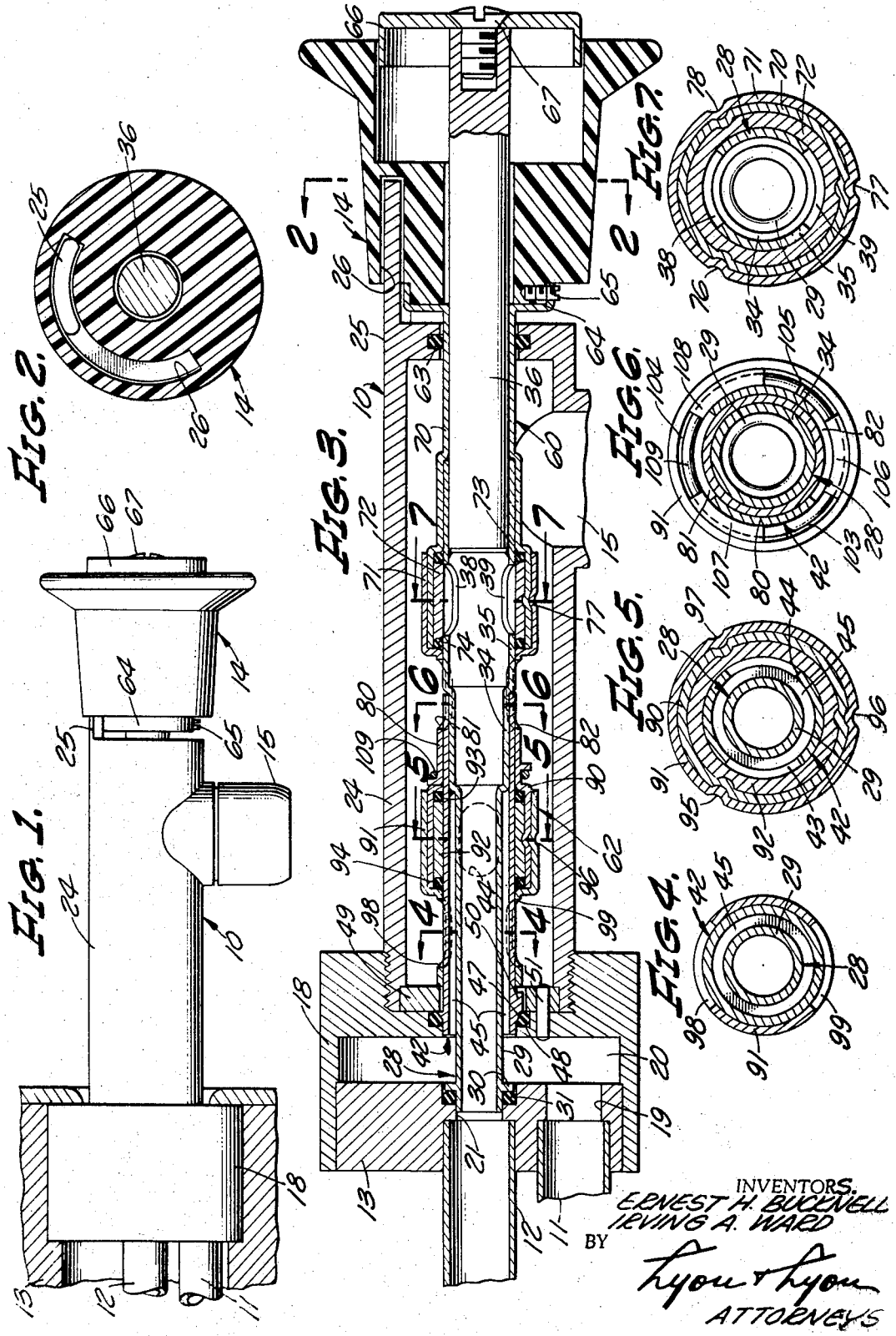
INVENTORS.
ERNEST H. BUCKNELL
IRVING A. WARD
BY
Lyon & Lyon
ATTORNEYS

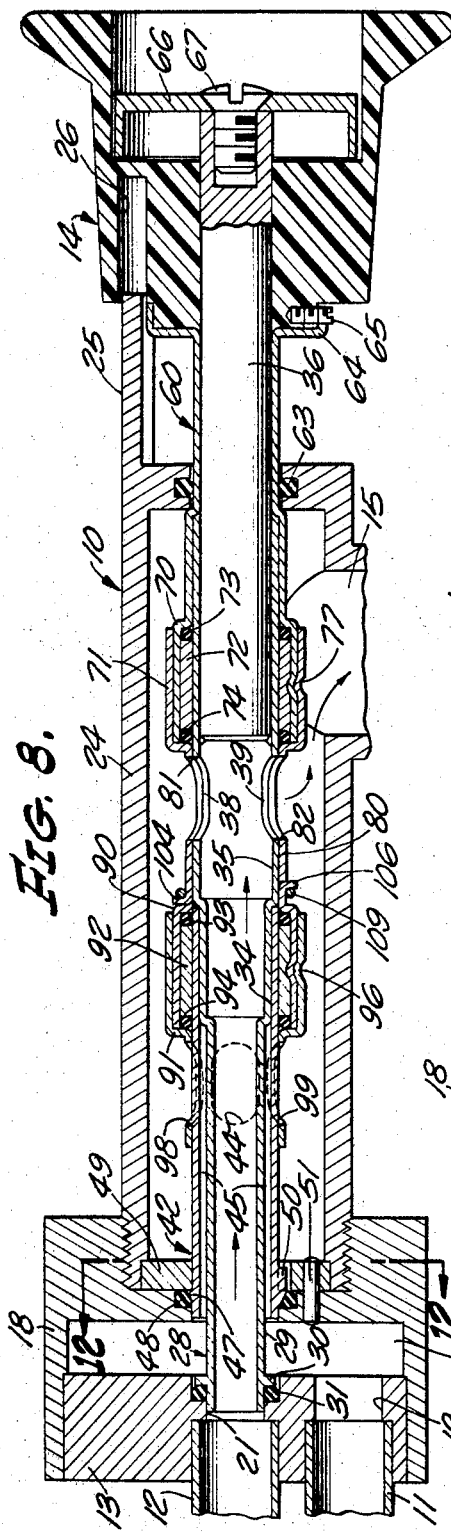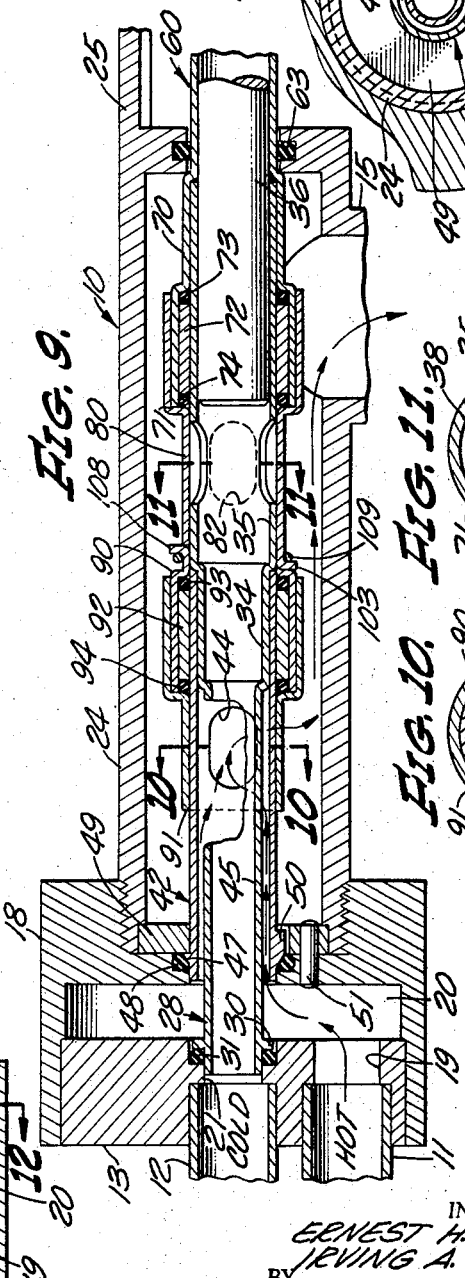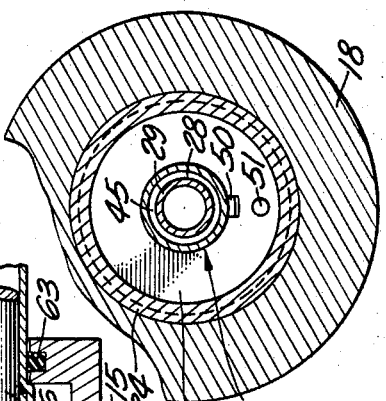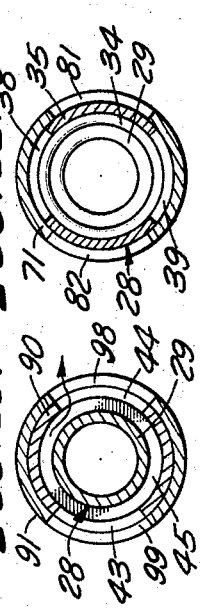

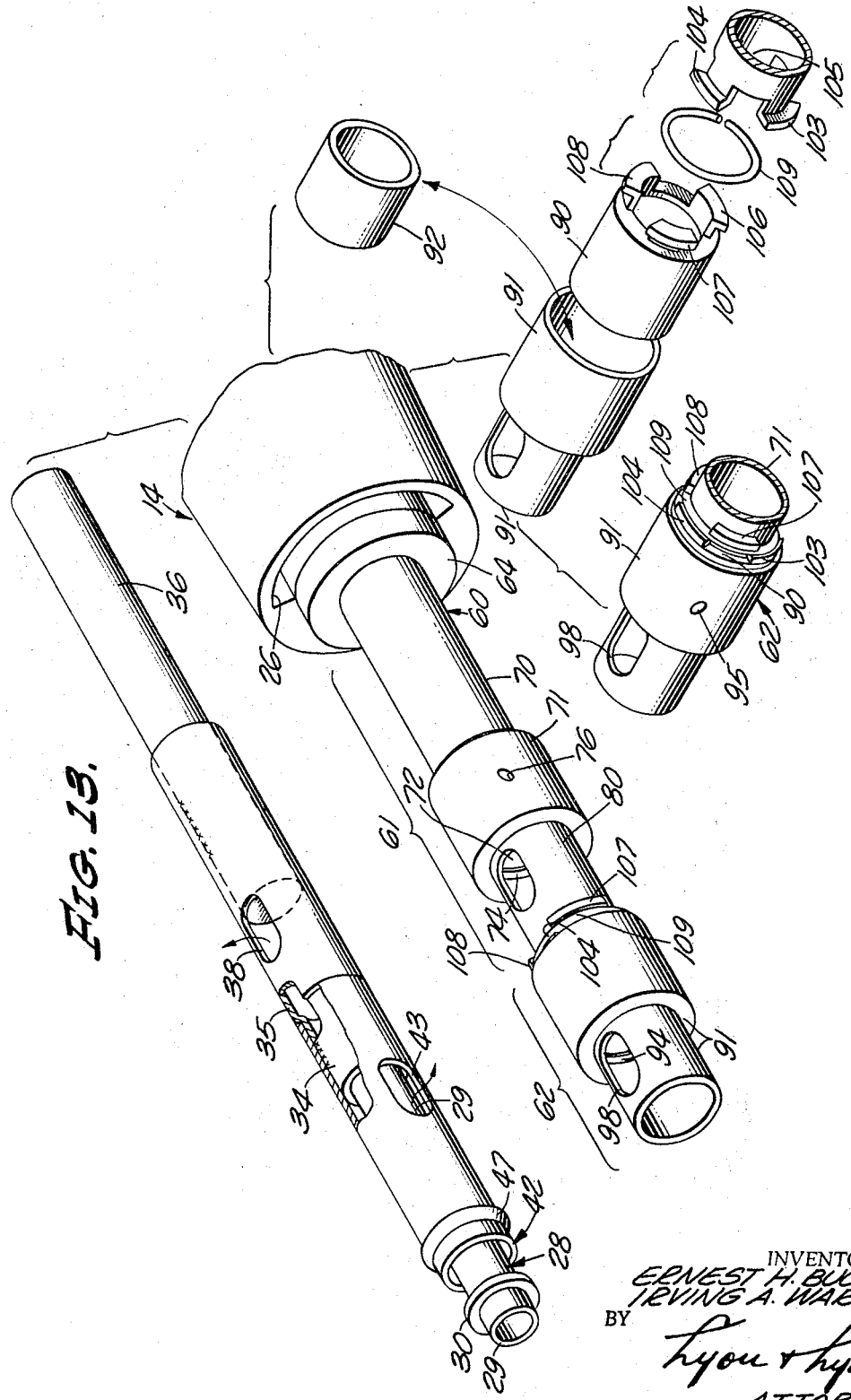

United States Patent Office 3,415,279
Patented Dec. 10, 1968

3,415,279
COAXIAL CONTROL VALVE
Ernest H. Bucknell and Irving A. Ward, Los Angeles, Calif., assignors of ten percent to estate of Ralph E. Bletcher, deceased; five percent each to Frederick Robertson and Gary Robertson; ten percent each to Lenora Bucknell, Richard H. Bletcher, and Dan G. Liston; five percent each to Dan G. Liston, as trustee for Daniel E. Liston and Carol Ann Liston, and James H. Liston; ten percent each to Hazel Brondum and Pearl Bletcher; five percent to Marcia Liston; and ten percent to Ernest H. Bucknell
Filed Oct. 22, 1965, Ser. No. 501,388
11 Claims. (Cl. 137—625.17)

ABSTRACT OF THE DISCLOSURE

A mixing type control valve for varying the volume and relative amounts of inlet fluids, such as hot and cold water. The control valve includes a first tube for receiving fluid and has a discharge port, and a second tube mounted over the first thereby defining a chamber between the first and second tubes for receiving fluid, the second tube also having a discharge port. A sleeve member having discharge openings which are capable of overlapping the respective discharge ports is mounted over the first and second tubes. Longitudinal and rotational movement of the sleeve member enables the volume and relative amounts of the fluids to be varied and supplied to an outlet.

---

This invention relates to a control valve and more particularly to an improved "mixing" type control valve for varying the volume of flow of inlet streams as well as the proportionate amounts thereof.

Various types of control valves employing a single control knob or lever for varying the volume and relative amounts of inlet fluids, such as hot and cold water, have been devised. Such valves are widely used and it is desirable that they be of relatively rugged and simple construction, reliable and easy to operate.

It is particularly desirable to provide control valves of this nature which are easy to operate throughout their control range. Certain prior art mixing type control valves are characterized by increased difficulty of operation at the extreme limit of control, such as at and near the on and off positions thereof, because of the internal effects of fluid pressure. Balanced control valves which overcome such difficulties are described in U. S. patent application Ser. No. 466,657, entitled "Control Valve," filed by applicants on June 24, 1965, and in U. S. patent application Ser. No. 501,389, entitled "Balanced Control Valve," and now abandoned, filed concurrently herewith by applicants, the disclosure of both of these applications being incorporated herein by reference.

It is an object of the present invention to provide a new control valve wherein the fluid pressures therein are balanced so as to eliminate positional changes in components of the control valve as a result of fluid pressures.

It is another object of this invention to provide a new and improved balanced control valve which is operated by single means and which may be easily operated throughout its control range.

A further object of this invention is to provide a control valve having coaxially mounted components and in which balance is maintained even upon the occurrence of surges in fluid pressure.

An additional object of this invention is to provide a compact coaxial control valve which is relatively easy to operate throughout its control range.

In accordance with an exemplary embodiment of the teachings of the present invention, an improved control valve is provided including a pair of stationary coaxially mounted inlet tubes or plugs for receiving fluids, such as hot and cold water. The opposite ends of the plugs are closed, and the plugs include discharge ports intermediate the ends thereof. A first fluid is applied to an end of the inner tube and passes through a chamber therein to its discharge port, and a second fluid is applied to the end of the second tube and passes through an annular chamber between the first and second tubes to the discharge port in the second tube. Sleeve means, including a pair of sleeves or sleeve sections having discharge openings similar to the discharge ports, is mounted coaxially with respect to the plugs. The sleeve means may be moved longitudinally and rotationally with respect to the plugs for appropriately positioning the discharge openings with the discharge ports to supply the desired mixture and volume of the fluids to an outlet.

These and other objects and features of this invention will become more apparent through a detailed consideration of the following description taken in conjunction with the accompanying drawings in which:

FIGURE 1 is a side elevation of a valve embodying the present invention;

FIGURE 2 is an end sectional view of the valve shown in FIGURE 1 taken along the line 2—2 of FIGURE 3;

FIGURE 3 is an enlarged side sectional view of the valve shown in FIGURE 1 and illustrates the valve in an "off" position;

FIGURE 4 is a sectional view taken along the line 4—4 of FIGURE 3;

FIGURE 5 is a sectional view taken along the line 5—5 of FIGURE 3;

FIGURE 6 is a sectional view taken along the line 6—6 of FIGURE 3;

FIGURE 7 is a sectional view taken along the line 7—7 of FIGURE 3;

FIGURE 8 is a sectional view similar to that shown in FIGURE 3, but with the valve in an "on" position;

FIGURE 9 is a partial sectional view similar to FIGURE 8, but with the valve in another "on" position;

FIGURE 10 is a sectional view taken along the line 10—10 of FIGURE 9;

FIGURE 11 is a sectional view taken along the line 11—11 of FIGURE 9;

FIGURE 12 is a sectional view taken along the line 12—12 of FIGURE 8; and

FIGURE 13 is a perspective view, partially in section, of certain of the stationary and movable components of the valve.

The drawings illustrate a "mixing" type faucet, including a control valve 10 constructed in accordance with the techings of this invention, and in which the flow of hot and cold water supplied through respective lines 11 and 12 attached to a fitting 13 is controlled by a knob 14 and discharged through an outlet 15 which may include an aerator. As will appear subsequently, the knob 14 is movable longitudinally with respect to the valve 10 for turning on and off and varying the volume of flow, and may be turned clockwise and counterclockwise (as viewed in FIGURE 2) to appropriately vary the mixture of hot and cold water.

A cup-shaped base 18 couples the valve 10 to the fitting 13. Hot water flows through the line 11 and a bore 19 to an annular cavity 20 between the fitting 13 and a body or base 18, and cold water flows through the line 12 and a bore 21 in the fitting 13 to the valve 10 as will be described in greater detail subsequently.

The valve 10 includes a housing 24 which is threaded into the base 18 at one end thereof, and includes a projection or finger 25 at the other end thereof which projects into an arcuate aperture 26 within the knob 14. The finger 25 and the aperture 26 serve to limit the rotational movement of the knob 14.

A first or "inner" stationary plug 28 includes an inlet section 29 of reduced diameter having a flange 30 thereon. The section 29 is positioned in the bore 21, and an O-ring 31 is seated between the flange 30 and a shoulder in the bore 21 to provide a suitable seal. The section 29 of the plug 28 includes a flange section 34 of greater diameter, and a section 35 having an alignment and thumb rest pin 36 suitably secured (as by solder) in the end thereof. The section 35 of the plug 28 includes a pair of opposed oval discharged ports 38 and 39 which are approximately normal to the direction of flow of cold water through the plug 28. Cold water flows through the bore 21 and the sections 29, 34 and 35 of the plug 28 to the ports 38 and 39.

A second or outer stationary plug 42 is mounted coaxially over the section 29 of the plug 28 and is suitably secured (as by solder) to the flange section 34 thereof. The plug 42 includes a pair of opposed oval discharge ports 43 and 44 (see FIGURES 3 and 13). Hot water flows through the bore 19, the cavity 20, and an annular chamber 45 (defined by the outer surface of the section 29 of the plug 28 and the inner surface of the plug 42) to the ports 43 and 44 which are arranged substantially normal to the longitudinal direction of fluid flow through the annular chamber 45. The inlet end of the plug 42 extends into the base 18 and includes an inclined flange 47. An O-ring 48 is provided between the flange 47 and a shoulder in the base 18 to provide a seal. A shoulder within the housing 24 bears against a plate 49 which in turn abuts the flange 47 and retains the plug 42 in the base 18. The plug 42 is aligned with respect to the plate 49 by means of a key 50, and the plate 49 is aligned respect to the base 18 by means of a pin 51.

Movable sleeve means 60, which essentially is formed in first and second sections 61 and 62, respectively, is arranged over the plugs 28 and 42 and passes through an O-ring 63 seated in a groove in the end of the housing 24. The sleeve means 60 includes a flanged end 64 which is attached to the knob 14 by means of a suitable set-screw 65 thereby enabling the sleeve means 60 to be moved longitudinally and rotationally by the knob 14. The knob 14 is mounted coaxially with respect to the pin 36 and has a cover or thumb rest 66 attached to the end thereof by means of a screw 67.

The section 61 of the sleeve means 60 includes two tubular members 70 and 71 fixedly coupled together along with an internal ring 72 to retain a pair of O-rings 73 and 74. As can be seen from FIGURE 7, the tubular members 70 and 71 and the ring 72 are secured together by forming depressions 76 through 78 therein. The tubular member 71 has a portion 80 of reduced diameter with a pair of opposed oval discharge openings 81 and 82 (note particularly FIGURES 3, 6, 8 and 13) which when appropriately positioned, may overlap the respective ports 38 and 39 in the plug 28.

The section 62 of the sleeve means 60 is constructed somewhat similarly to the section 61 and includes members 90 and 91 and an internal ring 92 retaining O-rings 93 and 94, the members and rings being secured together by means of depression 95 through 97 (see FIGURE 5). The member 91 has a pair of opposed oval discharge openings 98 and 99.

The members 80 and 90 (note FIGURE 13) include respective mating flange segments 103–105 and 106–108 which, along with a retaining ring 109 form a coupling between the sections 61 and 62 of the sleeve means 60. This coupling arrangement allows the two sections 61 and 62 to move together longitudinally and rotationally.

It will be appreciated that the sleeve means 60 may be moved longitudinally (left and right as viewed in FIGURE 3) and rotated a limited amount about the plug 42 by the knob 14. With the sleeve means 60 positioned by the knob 14 as illustrated in FIGURE 3, neither hot nor cold water passes through the valve to the outlet 15. If the knob 14 is pulled out (to the right in the drawings) to the position illustrated in FIGURE 8 cold water passes through the plug 28, the discharge ports 38 and 39, and the discharge openings 81 and 82 to the outlets 15. The knob 14, and thus the sleeve 60, may be rotated 90 degrees as illustrated in FIGURE 9 to supply hot water through the annular cavity 20, the annular chamber 45, the discharge ports 43 and 44, and the discharge openings 98 and 99 to the outlet 15. It thus will be apparent that the volume of water flow through the control valve 10 is determined by the longitudinal position of the sleeve means 60 and the mixture by the rotational position thereof. A typical longitudinal movement of the knob 14 from full off to full on may be one-half inch, and a typical rotational movement is ninety degrees.

It will be understood that although an exemplary embodiment of the present invention has been disclosed and discussed, other applications and structural arrangements are possible. Thus, the embodiment disclosed in detail may be subjected to various changes, modifications, and substitutions without necessarily departing from the spirit of the invention.

What is claimed is:
1. A control valve comprising
  plug means including first and second tubes, said first tube having a first portion for receiving a fluid and a second portion, said second tube being coaxially mounted on said first portion of said first tube forming an annular chamber between said first portion of said first tube and said second tube for receiving a second fluid, said first tube having a discharge port in the second portion communicating with the first portion of said first tube and approximately normal to the longitudinal axis thereof, said second tube having a discharge port longitudinally displaced from the discharge port in said first tube and communicating with said annular chamber and approximately normal to the longitudinal axis of said second tube,
  sleeve means coaxially mounted over said plug means and including first and second sections and means for coupling said sections for movement together, said first and second sections including respective discharge openings therein capable of registration with said ports, respectively, and
  knob means coupled with said sleeve means for varying the longitudinal and rotational position of said sleeve means with respect to said plug means to enable registration of a discharge opening with a discharge port.

2. A control valve comprising
  plug means including a pair of coaxially mounted tubes adapted to receive fluid, a first of said tubes including first and second portions, said first portion having a discharge port and said first tube having a fluid inlet chamber communicating with the port thereof, and the second of said tubes being mounted over the second porttion of the first tube and including a discharge port intermediate the ends thereof and a fluid inlet chamber between said second portion of the first tube and said second tube, said latter chamber communicating with the port of said second tube,
  sleeve means mounted over said plug means and having a plurality of discharge openings therethrough, said openings being spaced apart to enable the same to communicate with the respective ports in said first and second tubes, and
  means for varying the relative longitudinal and rotational position of said sleeve means with respect to said plug means to enable overlap of a discharge opening in said sleeve means with a discharge port in plug means.

3. A control valve comprising
  plug means including a pair of coaxially mounted stationary tubes adapted to receive fluid, a first of said tubes including first and second portions, said first portion having a discharge port and said first tube having a fluid inlet chamber communicating with the port thereof, and the second of said tubes being mounted over and secured to the second portion of the first tube, said second tube including a discharge port intermediate the ends thereof and a fluid inlet chamber between said second portion of the first tube and said second tube, said latter chamber communicating with the port of said second tube.

sleeve means mounted over said plug means and having a plurality of discharge openings therethrough, said openings being spaced apart to enable the same to communicate with the respective ports in said first and second tubes, and means for varying the relative longitudinal and rotational position of said sleeve means with respect to said plug means to enable registration of a discharge opening in said sleeve means with a discharge port in said plug means.

4. A control valve comprising plug means including a pair of coaxially mounted tubes providing a first inlet chamber and an annular inlet chamber adapted to receive fluids, a first of said tubes including first and second portions, said first portion having discharge ports communicating with said first inlet chamber, and the second of said tubes being mounted over the second portion of the first tube thereby defining said annular inlet chamber, said second tube including discharge ports intermediate the ends thereof communicating with said annular inlet chamber, sleeve means mounted over said plug means and having discharge openings therein for communicating with the respective ports in said first and second tubes, and means coupled with said sleeve means for varying the longitudinal and rotational position of said sleeve means with respect to said plug means to enable registration of a discharge opening in said sleeve means with a discharge port in said plug means.

5. A control valve comprising plug means including a pair of coaxially mounted tubes adapted to receive fluid along the longitudinal axis thereof, a first of said tubes including first and second portions, said first portion having a discharge port and said first tube having a fluid inlet chamber communicating with said port, and the second of said tubes being mounted over the second portion of the first tube and including a discharge port intermediate the ends thereof and a fluid inlet chamber between said second portion of the first tube and said second tube with said latter chamber communicating with the port of said second tube, said ports being longitudinally displaced, sleeve means mounted over said plug means and having like longitudinally displaced discharge openings therein, and means coupled with said sleeve means for varying the longitudinal and rotational position of said sleeve means with respect to said plug means to enable registration of a discharge opening in said sleeve means with a discharge port in said plug means.

6. A control valve comprising plug means including a pair of coaxially mounted tubes adapted to receive fluid along the longitudinal axis thereof, a first of said tubes including first and second portions, said first portion having a discharge port and said first tube having a fluid inlet chamber communicating with said port, and the second of said tubes being mounted over the second portion of the first tube thereby defining an annular inlet chamber, said second tube including a discharge port intermediate the ends thereof communicating with said annular chamber, said ports being longitudinally displaced, sleeve means mounted over said plug means and having like longitudinally displaced discharge openings therein, and means coupled with said sleeve means for varying the longitudinal and rotational position of said sleeve means with respect to said plug means to enable registration of a discharge opening in said sleeve means with a discharge port in said plug means.

7. A control valve comprising plug means including first and second tubes, said first tube having a first portion for receiving a fluid and a second portion, said second tube being coaxially mounted on said first portion of said first tube thereby forming an annular chamber for receiving a fluid, first portion of said first tube, said second tube having said first tube having a discharge port through the second portion thereof communicating with the first portion of said first tube, said second tube having a discharge port therethrough communicating with said annular chamber, sleeve means mounted over said plug means and having spaced discharge openings therein for enabling registration of said openings with said respective ports, and means coupled with said sleeve means for varying the longitudinal and rotational position of said sleeve means with respect to said plug means to enable registration of a discharge opening in said sleeve means with a discharge port in said plug means.

8. A control valve comprising plug means including a pair of coaxially mounted tube adapted to receive fluid, a first of said tubes including first and second portions, said first portion having at least a discharge port and said first tube having a fluid inlet chamber communicating with the port thereof, and the second of said tubes being mounted over the second portion of the first tube and including at least a discharge port intermediate the ends thereof and fluid inlet chamber between said second portion of the first tube and said second tube, said latter chamber communicating with the port of said second tube, sleeve means mounted over said plug means and having plural sections with means coupling said sections for movement together, said sections having respective discharge openings therein, and means coupled with said sleeve means for varying the longitudinal and rotational position of said sleeve means with respect to said plug means to enable registration of a discharge opening with a discharge port.

9. A control valve comprising plug means including a pair of coaxially mounted tubes, a first of said tubes including first and second portions, said first portion having a discharge port and said first tube having a fluid inlet chamber communicating with the port thereof, and the second of said tubes being mounted over the second portion of the first tube and including a discharge port intermediate the ends thereof and a fluid inlet chamber between said second portion of the first tube and said second tube with said latter chamber communicating with the port of said second tube, said ports of said first and second tubes being angularly and longitudinally displaced with respect to one another.

sleeve means mounted over said tube means and having plural sections with means coupling said sections for movement together, said sections including respective longitudinally displaced discharge openings therein, and means coupled with said sleeve means to vary the longitudinal and rotational position of said sleeve means with respect to said plug means to enable registration of a discharge opening with a discharge port.

10. A control valve for use with a plumbing fixture comprising a housing and a coupling for mounting said housing to said fixture, plug means including a pair of coaxially mounted tubes, a first of said tubes including first and second portions, said first portion having at least a discharge port and said first tube having a fluid inlet chamber communicating with the port thereof, and the second of said tubes being mounted over the second portion of the first tube thereby defining a fluid inlet chamber between said second portion of the first tube and said second tube, said second tube having a discharge port intermediate the ends thereof communicating with said latter chamber, said ports in said tubes being longitudinally displaced with respect to one another, sleeve means coaxially mounted over said tubes and having like longitudinally displaced discharge openings therein, and means including knob means coupled with said sleeve means for moving said sleeve means with respect to said plug means to enable selective and variable overlap of said discharge openings with respective discharge ports, and means coupled to said housing against which pressure may be exerted in moving said knob means.

11. A control valve comprising plug means including a pair of coaxially mounted tubes, a first of said tubes including first and second portions, said first portion having discharge ports and said first tube having a fluid inlet chamber communicating with the ports thereof, and the second of said tubes being mounted over the second portion of the first tube thereby defining a fluid inlet chamber between said second portion of the first tube and said second tube, said second tube including discharge ports intermediate the ends thereof communicating with said latter chamber, the ports of said first tube being angularly and longitudinally displaced with respect to the ports in said second tube, sleeve means mounted over said tubes and having like longitudinally displaced discharge openings therein, and means coupled with said sleeve means for varying the longitudinal and the rotational position of said sleeve means with respect to said tube means to enable registration of a discharge opening with a discharge port.

References Cited

UNITED STATES PATENTS

| | | | |
|---|---|---|---|
| 3,170,488 | 2/1965 | Manoogian | 137—625.17 |
| 3,202,181 | 8/1965 | West | 137—625.17 |
| 3,282,295 | 11/1966 | Skriletz et al. | 137—625.17 |

M. CARY NELSON, *Primary Examiner.*

W. R. CLINE, *Assistant Examiner.*

Disclaimer 3,415,279.—*Ernest H. Bucknell* and *Irving A. Ward*, Los Angeles, Cailf. COAXIAL CONTROL VALVE. Patent dated Dec. 10, 1968. Disclaimer filed Feb. 23, 1976, by the assignee, *Pearl White Bletcher*, part interest.

Hereby enters this disclaimer to her entire interest in all claims of said patent.

[*Official Gazette June 1, 1976.*]